United States Patent
Kay et al.

(10) Patent No.: US 11,268,843 B2
(45) Date of Patent: Mar. 8, 2022

(54) POWDER DISPENSING FIXTURE

(71) Applicant: K2R2 LLC, Camarillo, CA (US)

(72) Inventors: Robert L. Kay, Thousand Oaks, CA (US); Eric Plambeck, Ventura, CA (US); Zachary Francis, Oxnard, CA (US)

(73) Assignee: K2R2 LLC, Camarillo, CA (US)

( * ) Notice: Subject to any disclaimer, the term of this patent is extended or adjusted under 35 U.S.C. 154(b) by 82 days.

(21) Appl. No.: 16/916,794

(22) Filed: Jun. 30, 2020

(65) Prior Publication Data

US 2021/0404851 A1  Dec. 30, 2021

(51) Int. Cl.
| | |
|---|---|
| *B22F 3/12* | (2006.01) |
| *G01F 11/02* | (2006.01) |
| *G01F 11/00* | (2006.01) |
| *B65B 1/38* | (2006.01) |

(52) U.S. Cl.
CPC .......... *G01F 11/029* (2013.01); *G01F 11/003* (2013.01); *B65B 1/38* (2013.01)

(58) Field of Classification Search
CPC ......... G01F 11/029; G01F 11/003; B65B 1/38
See application file for complete search history.

(56) References Cited

U.S. PATENT DOCUMENTS

| | | | | |
|---|---|---|---|---|
| 1,455,970 | A * | 5/1923 | Resek | A47K 5/10 222/153.03 |
| 2,174,319 | A * | 9/1939 | Gastrow | B29C 45/72 222/146.5 |
| 2,319,233 | A * | 5/1943 | Hoppe | A47K 5/10 222/181.2 |
| 2,362,701 | A * | 11/1944 | Koehring | B30B 15/302 29/34 R |
| 3,912,125 | A * | 10/1975 | Acklin | G01F 11/021 222/165 |
| 6,450,371 | B1 * | 9/2002 | Sherman | G01F 11/18 222/336 |
| 6,811,061 | B2 * | 11/2004 | Tuvim | G01F 11/18 222/336 |
| 8,469,237 | B2 * | 6/2013 | Thulin | G01F 11/10 222/361 |

FOREIGN PATENT DOCUMENTS

| | | | |
|---|---|---|---|
| CN | 204907870 U | * 12/2015 | |
| EP | 0188820 A1 | * 7/1986 | B65B 1/38 |

* cited by examiner

*Primary Examiner* — Vishal Pancholi
*Assistant Examiner* — Bob Zadeh
(74) *Attorney, Agent, or Firm* — Graham Ross

(57) ABSTRACT

A module for dispensing a powder is disclosed. The module has a channel having an entry port, a hopper coupled to the entry port and configured to receive the powder, and a piston partially disposed within the channel and configured to reciprocate within the channel. The piston has a retracted position configured to allow the powder to move from the hopper through the entry port into the channel.

3 Claims, 10 Drawing Sheets

(shown in a "measure" position)

(shown in a "load" position)

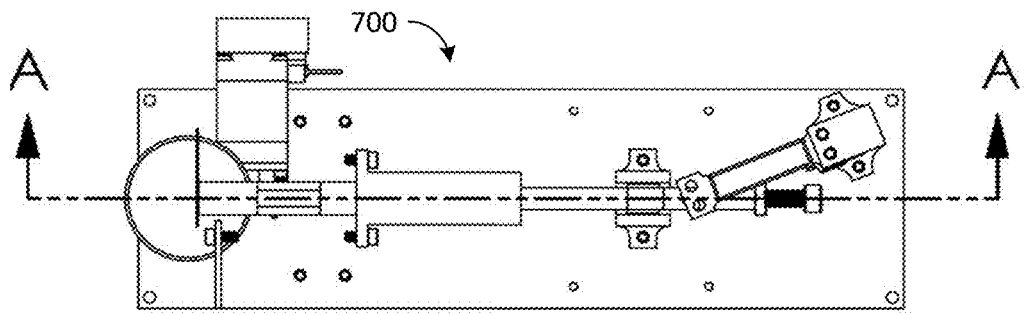
Figure 9A
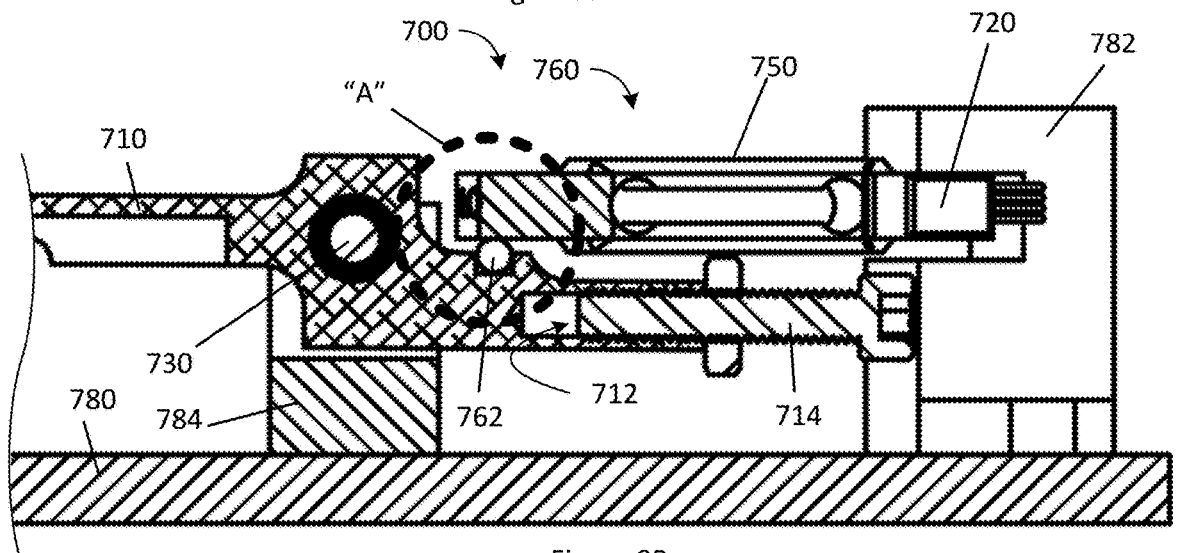
Figure 9B
(a portion of secton A-A from Fig. 9A)
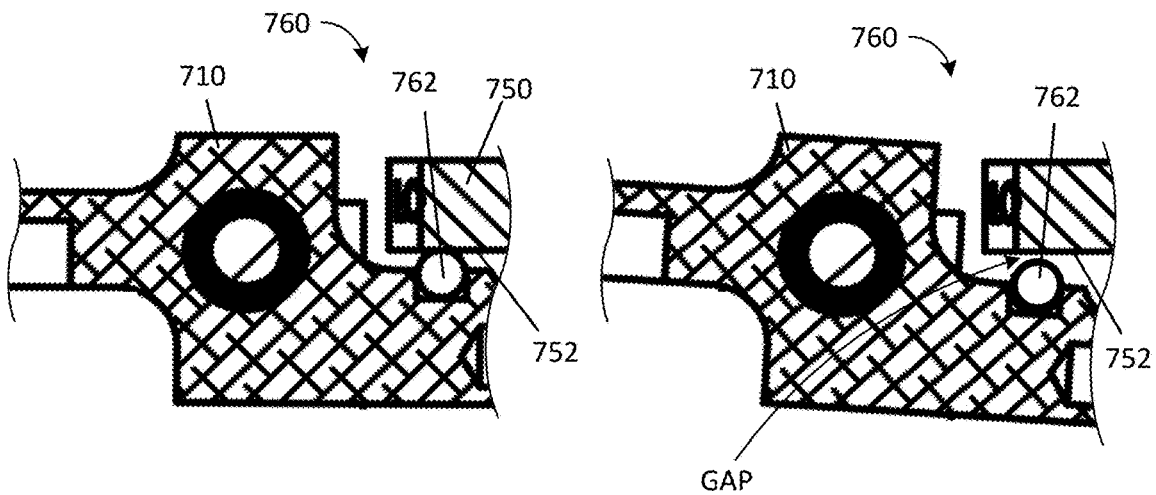
Figure 9C
(enlarged view of region "A" from Fig. 9B, shown in a "measure" configuration)
Figure 9D
(enlarged view of region "A" from Fig. 9B, shown in a "load" configuration)

(a portion of section B-B from Fig. 9E)

(enlarged view of region "B" from Fig. 9E)

POWDER DISPENSING FIXTURE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Field

The present invention generally relates to dispensing pre-determined amounts of a powder.

Description of the Related Art

Methods of dispensing a free-flowing uniform powder are known. In one approach, a known volume is filled with the powder then emptied into a transfer package. If the dispensed weight is the actual parameter of interest, the filled transfer package can be weighed to verify that the proper weight of powder was dispensed. Alternately, a controllable flow of the powder can accumulate a quantity of the powder on a scale, cutting off the flow of material at the pre-determined weight.

Certain powdered materials, including mixtures of a dry powder with a liquid, are inherently sticky and tend to clump rather than flow freely. The sticky powder tends to transfer in "lumps" that are often larger, i.e. heavier, than the precision with which it is desired to dispense the powder. Once too much of the sticky powder has been dispensed, the entire dispensed quantity must be discarded or recycled or a portion of the dispensed powder laboriously removed. This leads to reduced efficiency in the dispensing process.

An improved way of dispensing a sticky powder with high accuracy and repeatability is needed.

SUMMARY

A module for dispensing a powder is disclosed. The module includes a channel having an entry port, a hopper coupled to the entry port and configured to receive the powder, and a piston partially disposed within the channel and configured to reciprocate within the channel. The piston has a retracted position that allows the powder to move from the hopper through the entry port into the channel.

A fixture for dispensing a powder is disclosed. The fixture has a beam with a first end and second end, a receptacle coupled to the beam at the first end, a force sensor coupled to the beam at the second end, and a load transfer beam coupled between the force sensor and the second end. The load transfer beam has a first end and a second end, two panels each disposed between the first end and the second end, and four hinge points that are respectively connected between one of the panels and one of the first end and the second end.

A method of dispensing a powder is disclosed. The method has the steps of opening an entry port that is coupled to a hopper containing the powder, allowing the powder to move from the hopper through the entry port into a channel, closing the entry port, compressing the powder within the channel, opening an exit plane of the channel, extruding a portion of the compressed powder past the exit plane, and separating a portion of the extruded compressed powder from the remaining powder.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings:

FIGS. 9A-9G depict an exemplary mechanism to improve the measurement of dispensed material, according to certain aspects of the present disclosure.

DETAILED DESCRIPTION

The following description discloses embodiments of a system and method of.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

As used within this disclosure, the term "powder" is understood to include any granulated material, wherein the granules may be regular or irregular and may possess geometric attributes. The term further includes granules that stick to themselves or other materials or granules that may tend to selectively stick to themselves or other materials in certain circumstances or environments, for example temperature or humidity, while not exhibiting the same behavior in other circumstances. Granules may be hard and unyielding or soft and compressible.

As used within this disclosure, the terms "rigid" and "flexible" are understood to be relative terms within the normal range of human experience. An item may be considered rigid if it does not noticeably deform under the forces used in the described process. Similarly, an item may be considered flexible if it noticeably deforms under the forces used in the described process.

As used within this disclosure, the term "sharp" is understood to include tapered surfaces that retain a small blunt edge, which may be square or rounded or otherwise shaped, in addition to the usual concept of a tapered surface that converges to an edge without significant thickness. A thin generally planar object may also be considered to be sharp by virtue of its low thickness without regard to the shape of the edge, for example a piece of paper that can produce a "paper cut."

As used within this disclosure, the term "point" is understood to include both the ideal dimensionless location as well as the practical embodiment of compressible materials, where the contact area is finite but small compared to the geometry and dimensions of the two items that are touching.

Figure 1:
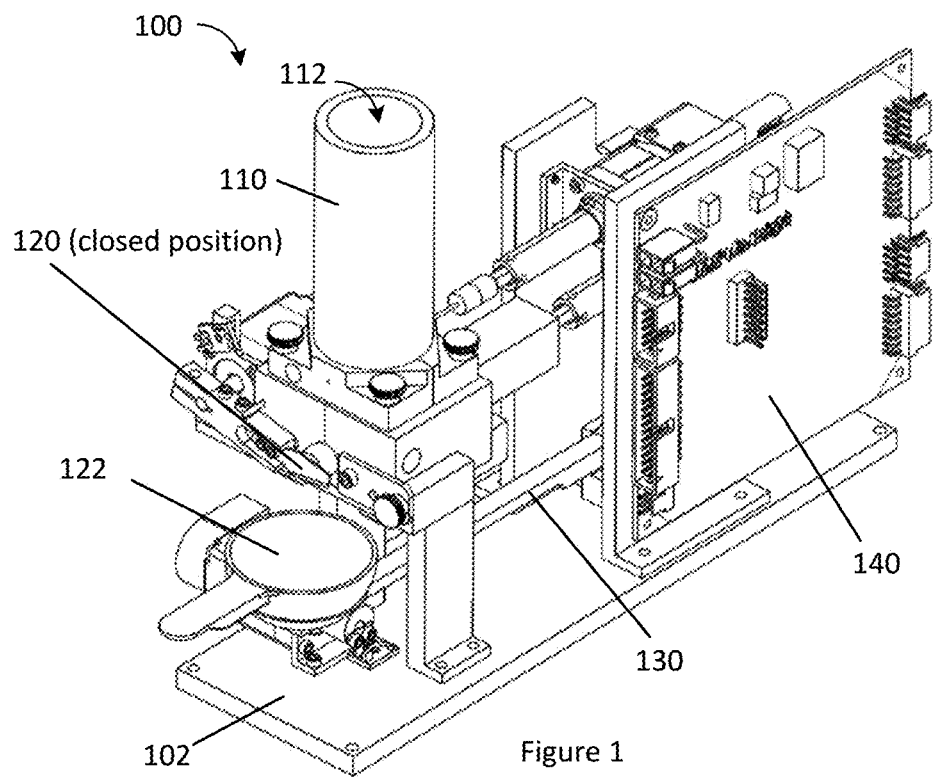
FIG. 1 depicts an exemplary powder dispensing fixture, according to certain aspects of the present disclosure.

FIG. 1 depicts an exemplary powder dispensing fixture 100, according to certain aspects of the present disclosure. The fixture 100 includes a dispenser 110 with a feed cavity 112 into which a loose powder (not shown in FIG. 1) may be loaded. A movable blade 120, shown in its "closed" position, is proximate to the dispenser 110. Interaction of the blade 120 and the dispenser 110 is described further with reference to FIGS. 8A-8D. An example receptacle 122, into which powder is dispensed, is positioned at one end of a measurement beam 130. A controller 140 is communicatively coupled to various elements of the fixture as well as, in certain embodiments, external devices (not shown in FIG. 1).

Figure 2:
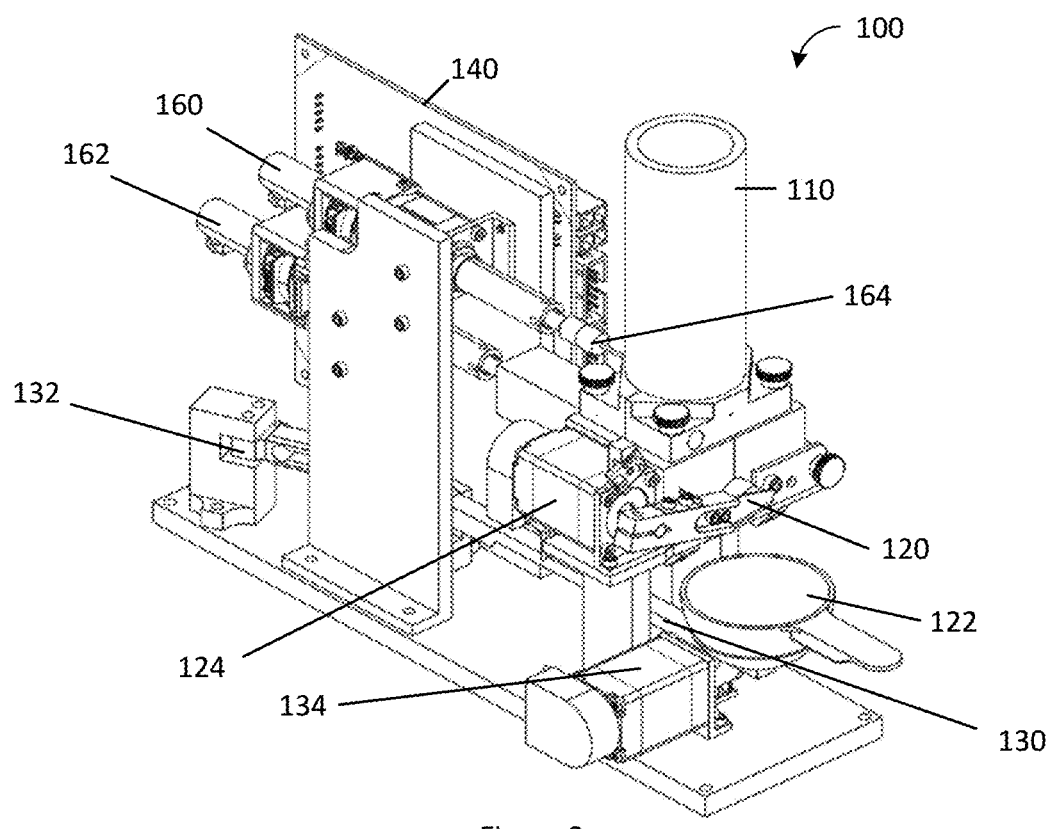
FIG. 2 depicts a reverse view of the powder dispensing fixture of FIG. 1, according to certain aspects of the present disclosure.

FIG. 2 depicts a reverse view of the powder dispensing fixture 100 of FIG. 1, according to certain aspects of the present disclosure. In this view, the "feed" actuator 160 and the "extrusion" actuator 162, which are coupled to the controller 140 and mechanically coupled to the dispenser 110, are visible. A coupler 164 is connected to actuator 160 and to an element of dispenser 110. A cut-off actuator 124 is visible, coupled to the blade 120 and controller 140. A force sensor 132, for example a load cell, is coupled to an end of the measurement beam 130. In certain embodiments, the controller 140 is coupled to the force sensor 132. In certain embodiments, a load-or-weigh actuator 134 is disposed under the receptacle 122 and is described further with respect to FIGS. 9A-9B.

Figure 3:
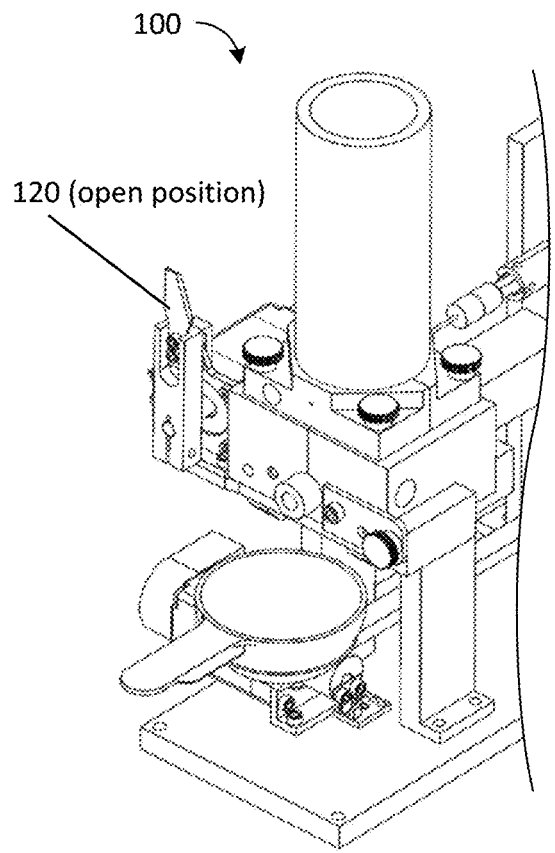
FIG. 3 depicts the powder dispensing fixture of FIG. 1 with the dispensing blade in a "open" position, according to certain aspects of the present disclosure.

FIG. 3 depicts the powder dispensing fixture 100 with the dispensing blade 120 in an "open" position, according to certain aspects of the present disclosure.

Figure 4:
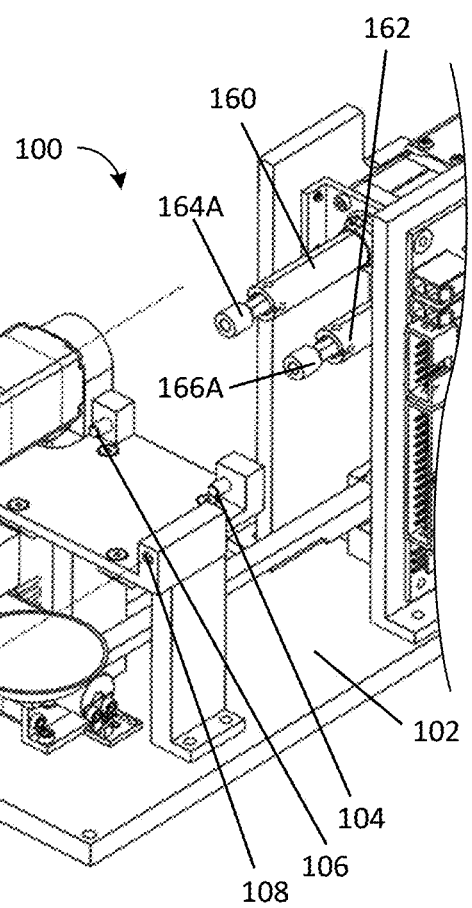
FIG. 4 depicts the dispenser being removed from the powder dispensing fixture of FIG. 1, according to certain aspects of the present disclosure.

FIG. 4 depicts dispenser 110 being removed from the powder dispensing fixture 100, according to certain aspects of the present disclosure. With the displacement of dispenser 110, the coupler 164 has separated, with portion 164A remaining attached to feed actuator 160 while portion 164B remains attached to the dispenser 110. Similarly, a coupler 166, which was not visible in FIG. 1 or 2, has separated with portion 166A remaining coupled to extrusion actuator 162 while portion 166B (visible in FIG. 5) remains attached to the dispenser 110.

The dispenser 110 is repeatably positioned with respect to the base 102 by engagement of alignment features 104, 106, and 108 with matching features (some not visible in FIG. 4). For example, a thumb screw 109 passes through feature 111, in this example a smooth hole, of the dispenser 110 to couple with feature 108, in this example a threaded hole. In this example, features 106, 108 are cylindrical pins and the matching features of dispenser 110 may be cylindrical or slot holes.

Figure 5:
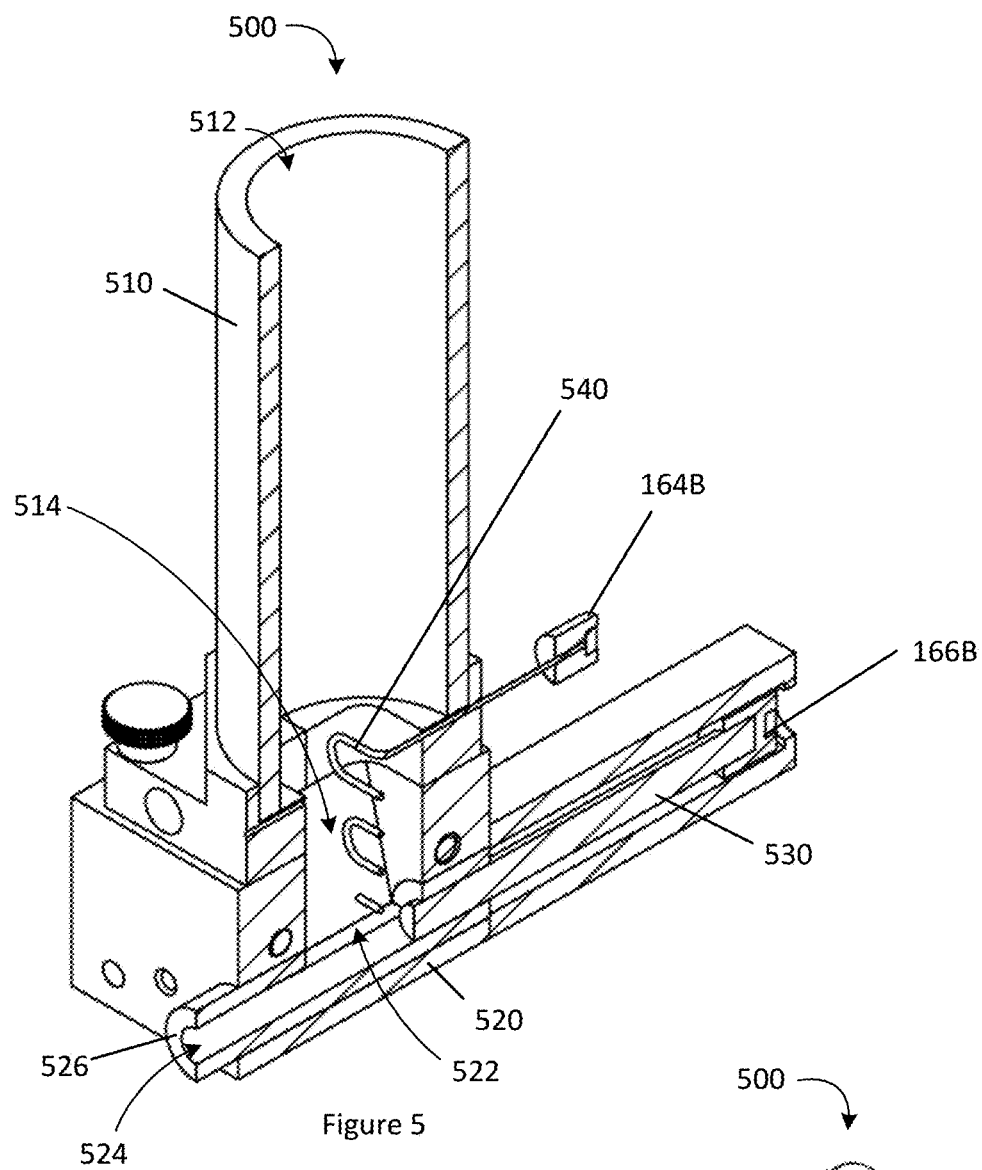
FIG. 5 depicts a cut-away view of the dispenser, according to certain aspects of the present disclosure.

FIG. 5 depicts a cut-away view of an exemplary dispenser 500, according to certain aspects of the present disclosure. The dispenser 500 comprises a shell 510 with a feed cavity 512 that is coupled to a hopper 514 that is further coupled to an entry port 522 of feed tube 520. The entry port 522 passes through the feed tube 520 to the feed channel 524, which terminates in an exit plane 526.

A piston 530 is partially disposed within feed channel 524 and configured to reciprocate within the channel 524. The piston 530 is coupled to portion 166B of coupling 166 such that, when the dispenser 500 is coupled to base 102 of fixture 100, extrude actuator 162 may selectably cause piston 530 to move or apply a force in a forward direction, i.e. toward exit plane 524, or to move or apply a force in the opposite rearward direction.

An agitator 540 (a portion has been rendered invisible by the cross-sectional view) is partially disposed within the hopper 514 to cause powder (not shown in FIG. 5) in the hopper 514 to move into the entry port 522. In certain embodiments, the agitator 750 is partially disposed within the feed cavity 512. In this example, the agitator 540 is coupled to portion 164B of coupler 164 such that, when the dispenser 500 is coupled to base 102 of fixture 100, feed actuator 160 may selectably cause agitator 540 to move with respect to hopper 514.

In certain embodiments, the agitator comprises a port to supply a flow of air or other gas (not shown in FIG. 5) into the hopper 514 and/or feed cavity 512. In certain embodiments, the agitator comprises a vibrator or shaking device (not shown in FIG. 5) coupled to the dispenser 500. In certain embodiments, the agitator comprises a reciprocating element (not shown in FIG. 5) partially disposed within the hopper 514 and/or feed cavity 512 and configured to urge the powder toward the channel 524. In certain embodiments, the agitator 540 is omitted and gravity is sufficient to cause the powder to flow from the hopper 514 into the channel 524.

Figure 6:
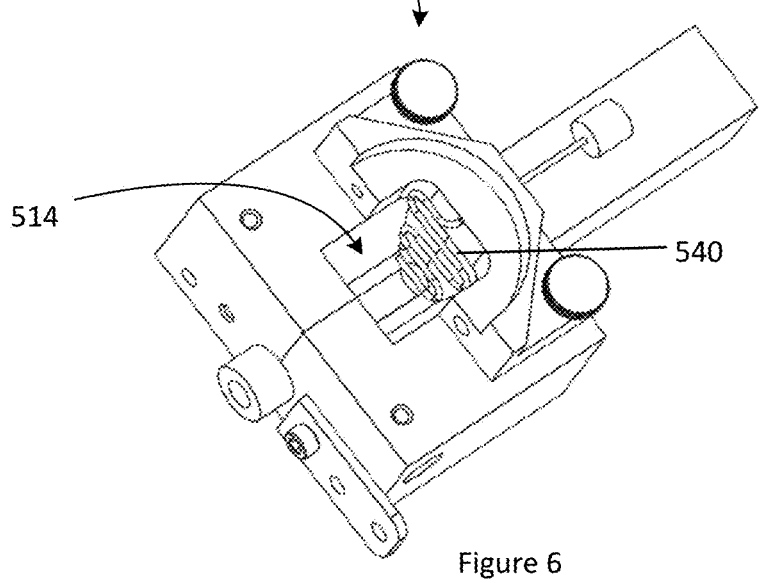
FIG. 6 depicts a view into the lower portion of the dispenser, according to certain aspects of the present disclosure.

FIG. 6 depicts a view into the lower portion of the dispenser 500, according to certain aspects of the present disclosure. It can be seen how the serpentine pattern of agitator 540 conforms to the shape of hopper 514.

Figure 7:
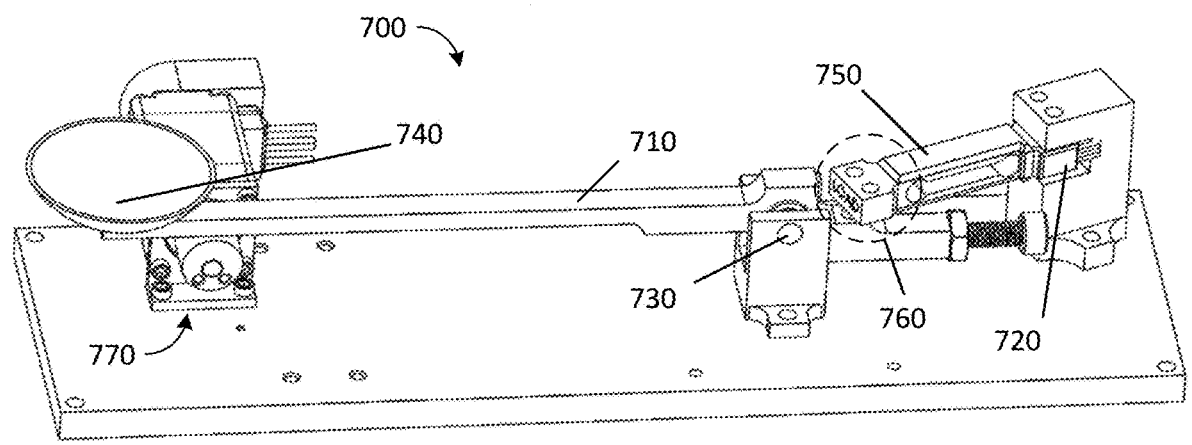
FIG. 7 depicts an exemplary balance beam subassembly of the powder dispensing fixture, according to certain aspects of the present disclosure.

FIG. 7 depicts an exemplary balance beam subassembly 700 of the powder dispensing fixture 100, according to certain aspects of the present disclosure. The subassembly 700 comprises a beam 710 having at one end an attachment point 740 for a dispensing receptacle, for example receptacle 122 (not shown in FIG. 7). In certain embodiments, the receptacle 122 is configured such that the center-of-gravity (CG) of the contents of receptacle 122 is located at the attachment point 740. The beam 710 rotates about a fulcrum 730 and is coupled at the end opposite the attachment 740 to a load transfer beam 750 that is further coupled to a force sensor 720, for example a load cell. Details of the coupling of the beam 710 to the load transfer beam 750 are discussed further with respect to FIGS. 9A-9B. A mechanism 770 is disposed under the beam 710 one the side toward the attachment point 740 and is discussed in further detail with respect to FIGS. 8A-8B.

Figure 8A:
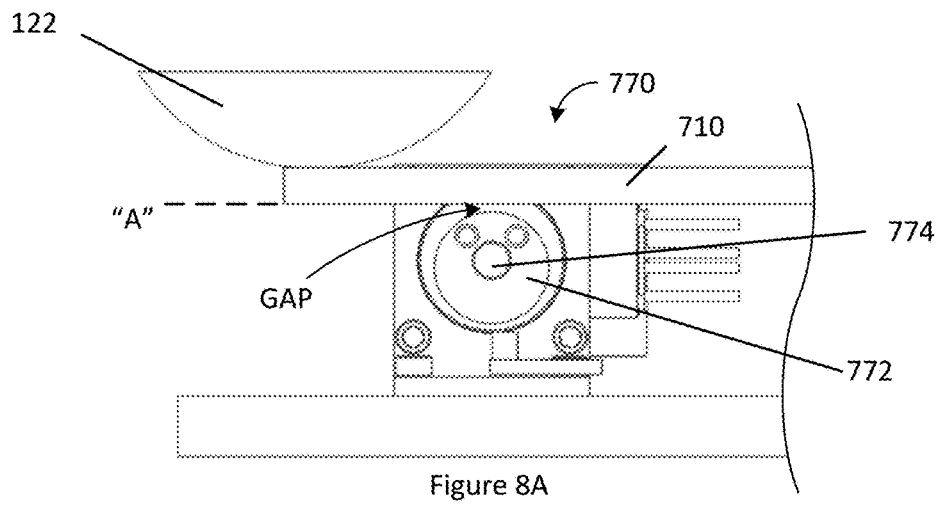
FIGS. 8A-8B depict an exemplary mechanism to improve the measurement of dispensed material, according to certain aspects of the present disclosure.
Figure 8B:
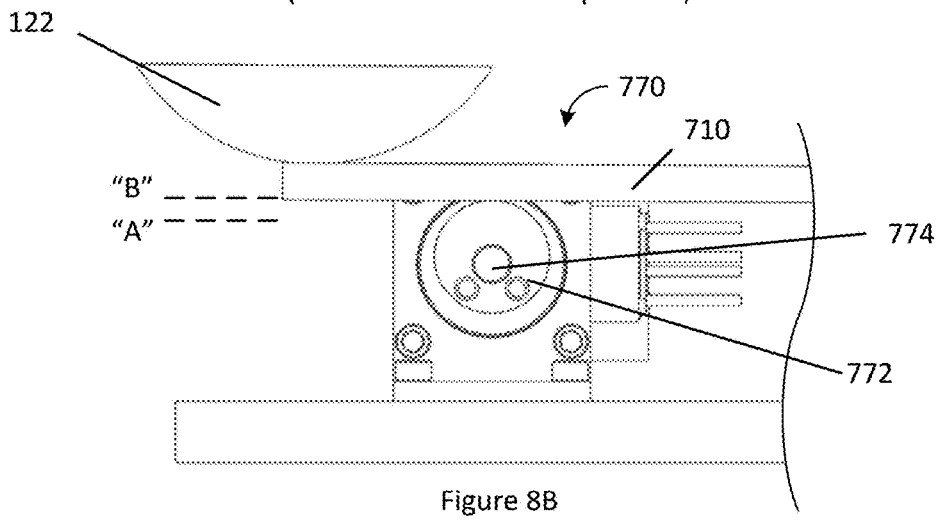

FIGS. 8A-8B depict an exemplary mechanism 770 to improve the measurement of dispensed material, according to certain aspects of the present disclosure. The mechanism 770 comprises a rotating actuator, for example actuator 134 from FIG. 1, coupled to an eccentric cam 772 that rotates about center 774. In this example, the cam 772 is disposed underneath the beam 710. In the "measure" position shown in FIG. 8A, there is a gap between the cam 772 and the beam 710 such that no support is provided by the mechanism 770 to the beam 770. This allows the beam 710 to rotate about fulcrum 730 and the force sensor 720 to make a measurement related to the weight of material in the receptacle 122.

FIG. 8B depicts the mechanism 770 is a second "load" position, wherein the cam 772 has rotated and is now in contact with the beam 710, causing the end of beam 710 to rise from reference position "A" to a second reference position "B" that is above "A." The difference in positions "A" and "B" has been exaggerated in this figure and, in practice, may be near zero. The weight of material in receptacle 122 is largely carried by the cam 772, thereby protecting the force sensor 720 from transient forces induced by loading of material into the receptacle 122.

In operation, the following steps are implemented:
1. move mechanism 770 to its "load" position,
2. add material to receptacle 122,
3. allow the material to stabilize and any resonant flexion of beam 710 to dampen out,
4. move mechanism 770 to its "measure" position, and
5. measure the weight of material in receptacle 122.

One aspect of mechanism 770 is that the change from the "load" position to the "measurement" position is controlled by the profile of the eccentric cam 772, which in this example is a smooth circle, that provides a gentle and controlled motion of the system from one position to the other without an impact or stop that may induce an impulse or other structural disturbance that would cause beam 710 or other parts of the fixture 700 to resonate and adversely affect the measurement. Control of the motion, for example by implementing a profile of the speed or acceleration or higher-order aspects of the motion, can further protect against any disturbance of the system during this motion. Elimination of a "settling time," as is often required in measurement systems, shortens the process time.

FIGS. 9A-9G depict an exemplary mechanism 760 to improve the measurement of dispensed material, according to certain aspects of the present disclosure.

FIG. 9A is a plan view of the powder dispensing fixture 700, showing a section line A-A.

FIG. 9B is a portion of the view of section A-A of FIG. 9A. The beam 710 is configured to rotate about fulcrum 730, which is mounted to pivot block 784 that is attached to base 780. A bolt 714 is engaged in a threaded hole 712 in beam 710 such that the center-of-gravity (CG) of beam 710 may be adjusted by rotating the bolt 714 to move it relative to the beam 710.

An exemplary mechanism 760 is disposed between the beam 710 and holding block 782 that is attached to base 780. The mechanism 760 comprises a ball 762 and an exemplary load transfer beam 750. A portion of force sensor 720 is visible proximate to an end of beam 750.

FIG. 9C is an enlarged view of region "A" of FIG. 9B, wherein the fixture 700 is in a "measure" configuration. In certain embodiments, this configuration may be induced by the mechanism 770 being in its "measure" position as shown in FIG. 8A. The ball 762 is in contact with surface 752 of the beam 750. The weight of material in receptacle 122 will urge beam 710 to rotate counterclockwise, in the view of FIG. 9C, and cause the ball 762 to press upwards against this end of beam 750. Contact between ball 762 and surface 752 is, in an ideal sense, a point. In certain configurations, the ball may be equivalently replaced with other geometric forms, for example a cone or pyramid, that are coupled to either of the beam 710 or the load transfer beam 750 such that the beam 710 and load transfer beam 750 are in point contact and may transfer only compressive force, e.g. no moment can be transferred across the point contact. The function and benefits of this configuration are discussed in greater detail with respect to FIGS. 9F-9G.

FIG. 9D is the same view as FIG. 9C with the fixture 700 in a "load" configuration. In certain embodiments, this configuration may be induced by the mechanism 770 being in its "load" position as shown in FIG. 8B. The ball 762 is not in contact with surface 752, with a gap as indicated. In this configuration, loads cannot be transferred from beam 710 to transfer beam 750.

Figure 9E:
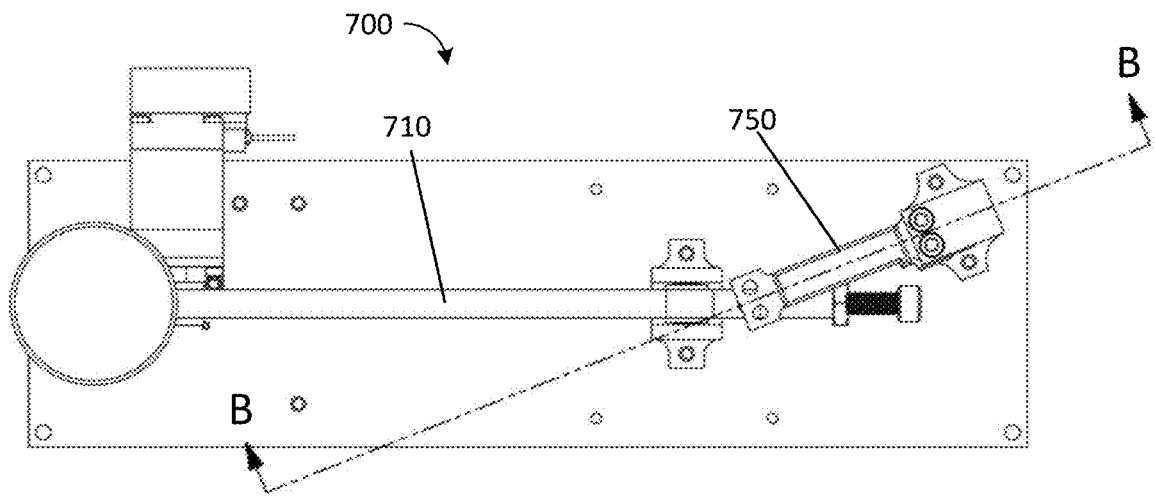

FIG. 9E is a plan view of the powder dispensing fixture 700, showing a section line B-B.

Figure 9F:
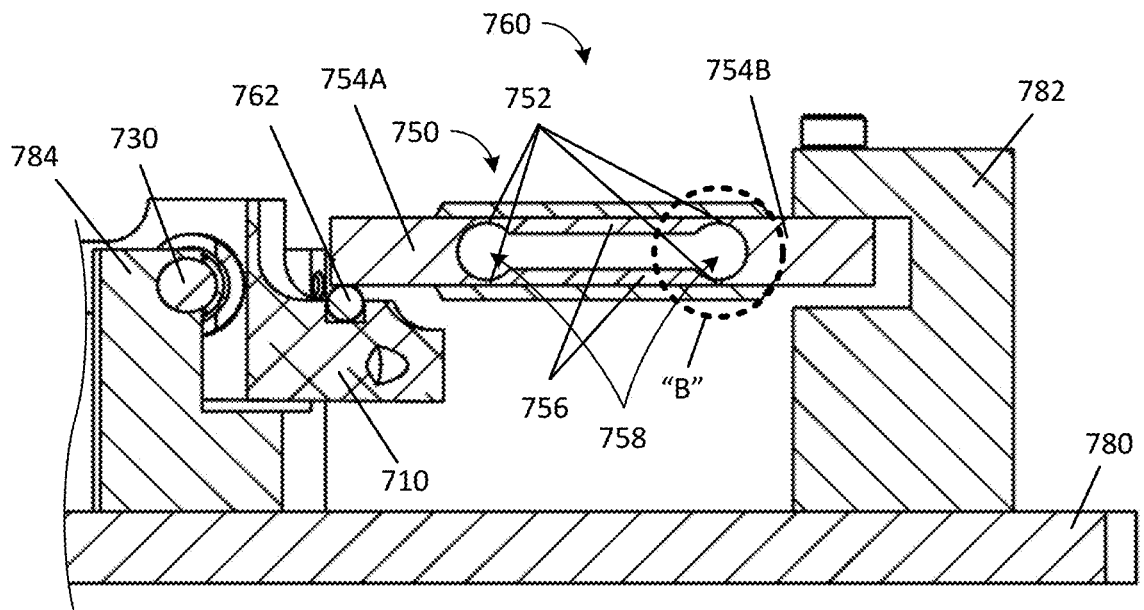

FIG. 9F is a portion of the view of section B-B of FIG. 9E showing the entire load isolation mechanism 760. The mechanism 760 comprises the transfer beam 750, which is fixedly attached at one end to holding block 782 and extends toward beam 710 in a cantilever manner. The mechanism 760 also comprises ball 762, which is disposed within a recess of beam 710 in this example, that is in point contact with transfer beam 750.

The transfer beam 750 is shaped to form, in functional essence, a four-bar linkage. The ends 754A and 754B are solid blocks that are full thickness of the beam 750. There are four hinge points 752 formed, in this example, by the circular bores 758. The hinge points 752 connect the ends 754A, 754B to panels 756 that are the full width of beam 750 and of sufficient thickness that they are rigid and unbending in tension or compression. In certain embodiments, the hinge points 752 are integrally connected to the panels 756 and the ends 754A, 754B. In certain embodiments, the hinge points 752, panels 756, and the ends 754A, 754B are formed from a single piece of material, for example a metal, plastic, ceramic, or glass. In certain embodiments, a hinge point 752 comprises a movable interface allowing relative translational and/or rotational motion between the proximate end 754A or 754B and the proximate panel 756 in at least one direction.

In operation, an upward force is applied by ball 762 to end 754A. End 754B is constrained from moving or rotating by its attachment to holding block 782. The hinge points 752 bend locally and the panels 756 remain straight and rotate, so end 754A translates upward without rotation. In an example, a one pound load may cause only a 0.010 inches upward deflection of end 754A, resulting in a horizontal movement of the point of contact of ball 762 of approximately 0.00002 inches or 0.001%, which is effectively zero in most endeavors. Thus, one aspect of the load isolation mechanism 760 is that angular changes in the direction of load transfer, induced by either rotation of beam 710 or deflection of transfer beam 750, within the mechanism are eliminated with negligible effect on the measurement. Additionally, shear force transfer across the point contact is effectively eliminated as the area of contact is so small that largest force that can be transferred before one of the beam 710 and load transfer beam 750 slides with respect to the other is negligible.

Figure 9G:
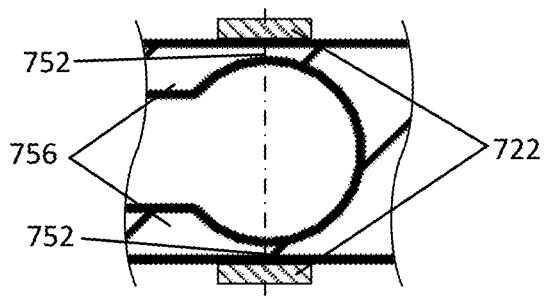

FIG. 9G is an enlarged view of region "A" of FIG. 9F. Application of a load by ball 762 to transfer beam 750, for example when material is placed in receptacle 122 of FIG. 1, will cause panels 756 will rotate clockwise, in the view of FIG. 9G, and hinge points 752 will both bend in a clockwise direction. Stain gauges 722 are fixedly coupled to the outside surfaces of transfer beam 750 over the hinge points 752 and are communicatively couples to the force sensor 720 (not shown in FIG. 9G). Bending of hinge points 752 will cause the surfaces to either stretch, for the bottom hinge point 752, or compress, in the case of the top hinge point 752. This stretching or compression will induce a change in the strain gauges 722 that is converted to a signal by the force sensor 720, as is commonly understood by those of skill in the art. This signal may, for example, be passed to the controller 140 of FIG. 1 or other processor to be converted into a measurement of the weight of material in receptacle 122.

FIG. 10A-10D depict an exemplary sequence of steps of a dispense cycle, according to certain aspects of the present disclosure. These figures depict a cross-sectional view of a portion of the dispenser 500 of FIG. 5.

Figure 10A:
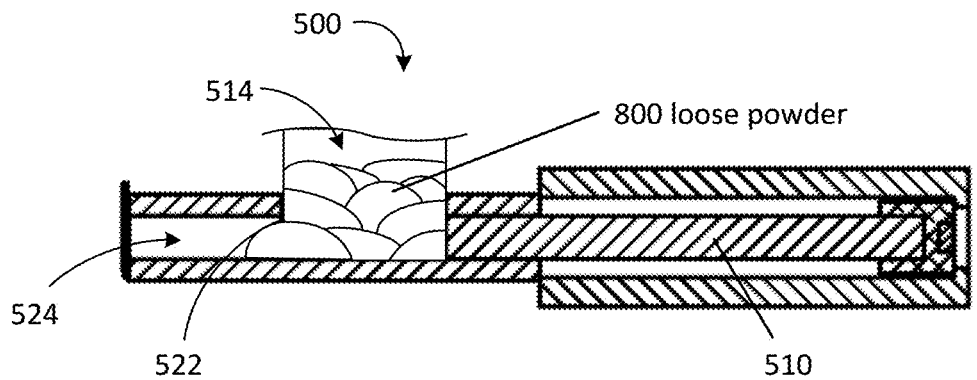
FIGS. 10A-10D depict an exemplary sequence of steps of a dispense cycle, according to certain aspects of the present disclosure.

FIG. 10A depicts piston 510 a piston that is partially disposed within the channel 524 and configured to reciprocate within the channel 524. The piston has a retracted position with respect to channel 524, as shown in FIG. 10A, wherein the piston is generally clear of the entry port 522. In this position, loose powder 800 flows from the hopper 514, without or without the activation of an agitator (not shown in FIGS. 8A-8D), through entry port 522 into a portion of channel 524.

Figure 10B:
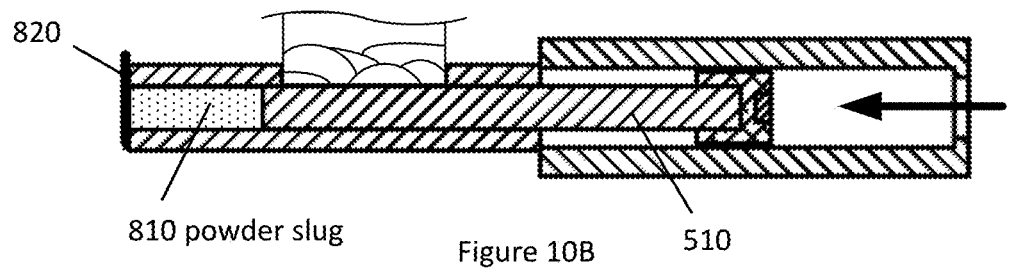

FIG. 10B depicts the piston 510 moved forward to a second position, wherein the forward tip of piston 510 seals off the entry port 522 and disposed within a closed portion of channel 524. The blade 120 is in its closed position proximate to the exit plane 526 (see FIG. 5) of the feed channel 524. In certain embodiments, a predetermined force is applied, for example by actuator 162, in a forward direction to compress the powder 800 against blade 120 to form a packed powder "slug" 810.

Figure 10C:
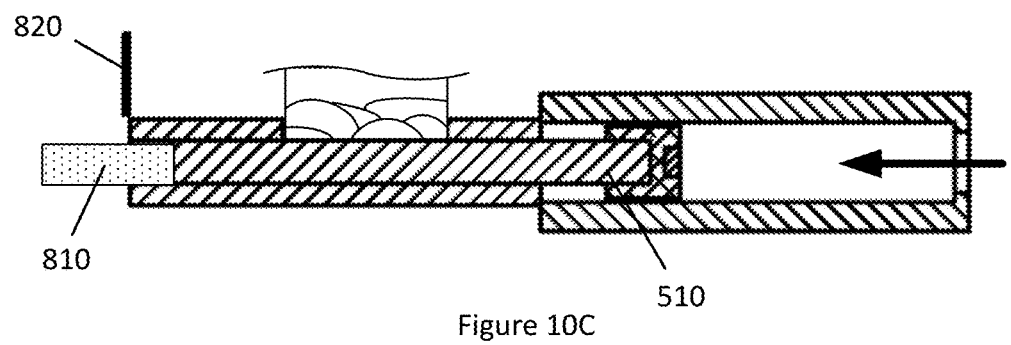

FIG. 10C depicts the blade 120 having been moved to its open position and piston advanced forward from its position of FIG. 8B. The powder slug 810 has been moved forward such that a portion of the powder slug 810 extends beyond the exit plane 526. In the case of a sticky powder, the powder slug 810 will retain its integrity and extend in a cantilever manner from the channel 524. For certain powders, the powder slug 810 may extend a distance equivalent to 0.5×-2× the diameter of channel 524.

Figure 10D:
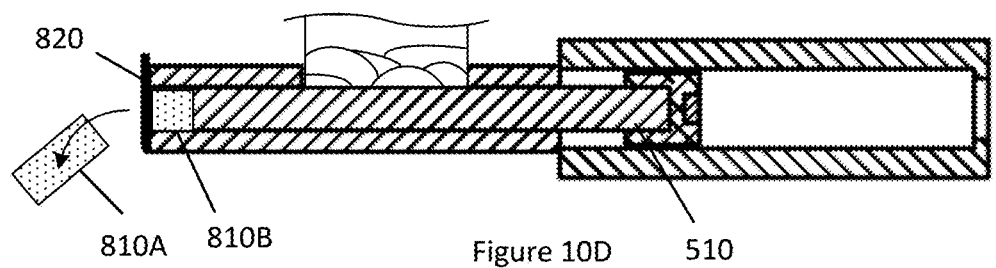

In certain embodiments, the blade 820 moves to a partially-open position (not shown in FIG. 10D, such that a reduced cross-section of the channel is open and the extended portion 810 has a cross-section that is likewise reduced. This provides an ability to dispense a smaller amount of the powder, compared to the full cross-section extended powder slug 810.

In certain embodiments, the piston 510 has features (not shown in FIGS. 10A-10D) extending from or recessed into the forward end. As the loose powder 800 is compressed into the powder slug 810, these features may be embedded into the slug 810 or a portion of the slug 810 may extend into the feature and thereby couple the slug 810 to the piston 510. In certain embodiments, this coupling enables the piston to retract the slug 810 rearward into the channel 524. In certain embodiments, this coupling reduces further compression of the portion of the slug 810 that is proximate to the piston 510, thereby improving control over the amount of the slug 810 extruded from the channel.

FIG. 10D depicts the blade 820 moving to its closed position, the action of which cuts off the extended portion 810A of the powder slug 810, leaving the remaining portion 810B disposed within the channel 524. In certain embodiments, the blade 820 has a sharp edge. In certain embodiments, the blade 820 has a flat or shaped edge.

In certain embodiments, the blade 820 moves to a partially-closed position (not shown in FIG. 10D, that separates a portion of the extended portion 810 from the remaining portion 810B.

In certain embodiments, the blade 820 is implemented in other forms, for example a shaped block or a transverse wire or a air jet, that separates a portion of the extruded compressed powder 810.

In certain embodiments, the portion 810A will fall into a measurement receptacle, for example receptacle 122 of FIG. 1, whereupon the weight of portion 810A will be determined, for example by the force sensor 132 of FIG. 2. In certain embodiments, the controller 140 of FIG. 1 receives a signal from the force sensor 132 and determines whether the weight of the portion 810A is within an acceptable range.

In certain embodiments, the controller may determine that the weight of power within the receptacle is below the acceptable range and cause the piston 510 to return to the position of FIG. 10A and repeat the steps of FIGS. 10B-10D with a target size of portion 810A adjusted to be less than or equal to the difference between the measured weight of the powder in the receptacle and the acceptable range.

In certain embodiments, the controller may determine that the weight of power within the receptacle is within the acceptable range and provide a signal, for example a red light and/or an audible indicator, that the dispensed powder is within the target range, whereupon an operator may empty the powder in the receptacle into the feed cavity 112 of the powder dispensing fixture 100 of FIG. 1.

In certain embodiments, the controller may determine that the weight of power within the receptacle is above the acceptable range and provide a signal, for example a green light and/or audible indicator, that the dispensed powder is within the target range, whereupon an operator may empty the powder into a second container, return the empty receptacle to the fixture, and initiate a new dispense cycle of the fixture.

In certain embodiments, the functions of the controller 140 may be performed by a remote controller (not shown) that is communicatively coupled to the controller 140.

Figure 11A:
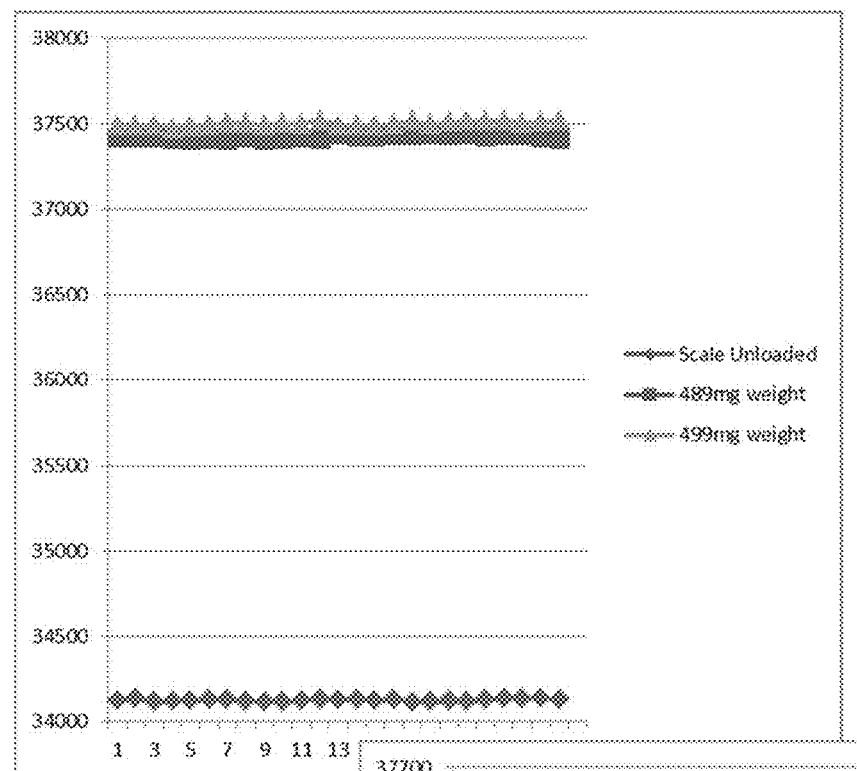
FIGS. 11A-11B depict experimental results from testing of a powder dispensing fixture, according to certain aspects of the present disclosure.
Figure 11B:
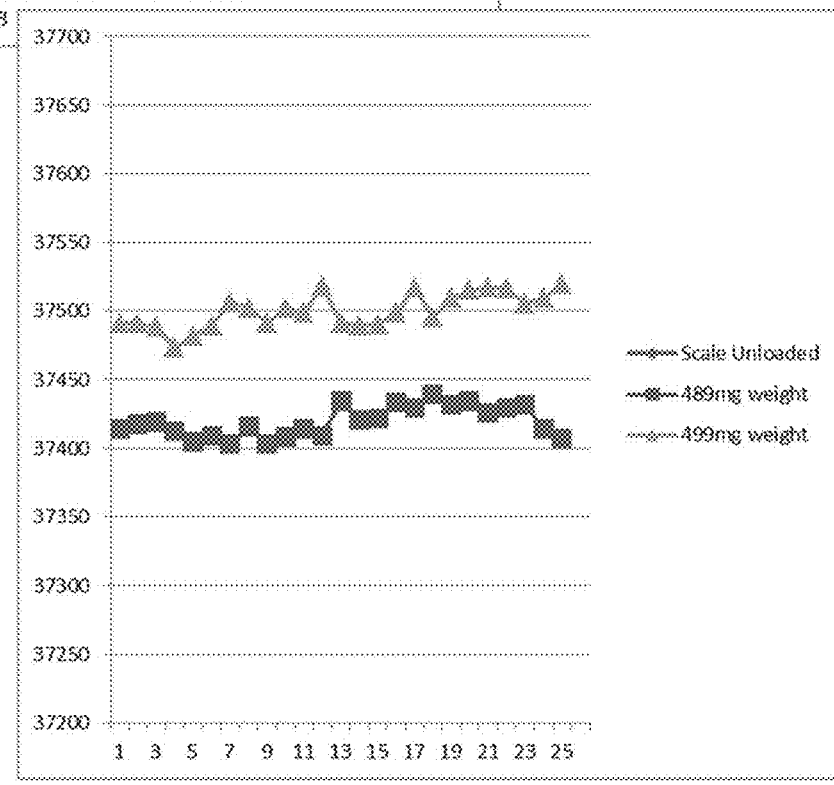

FIGS. 11A-11B depict experimental data collected using the powder dispensing fixture, according to certain aspects of the present disclosure. In FIG. 11A, sequential measurements are made with an unloaded scale, i.e. the fixture 100 without any material in receptacle 122, with a first weight of 489 mg placed in the receptacle 122, and with a second weight of 10 mg added to the first weight in receptacle 122. These sequential measurements are plotted along the x-axis as samples 1-25. The y-axis is scaled in an arbitrary output of the force sensor 720.

FIG. 11B is an enlarged view of the portion of the Y-axis showing just the two measurements with weights in the receptacle 122. It can be seen that the 10 mg differences between the 489 mg and 499 mg weights, approximately a 2% difference, are clearly distinguished from the variability of each of the conditions.

Figure 12:
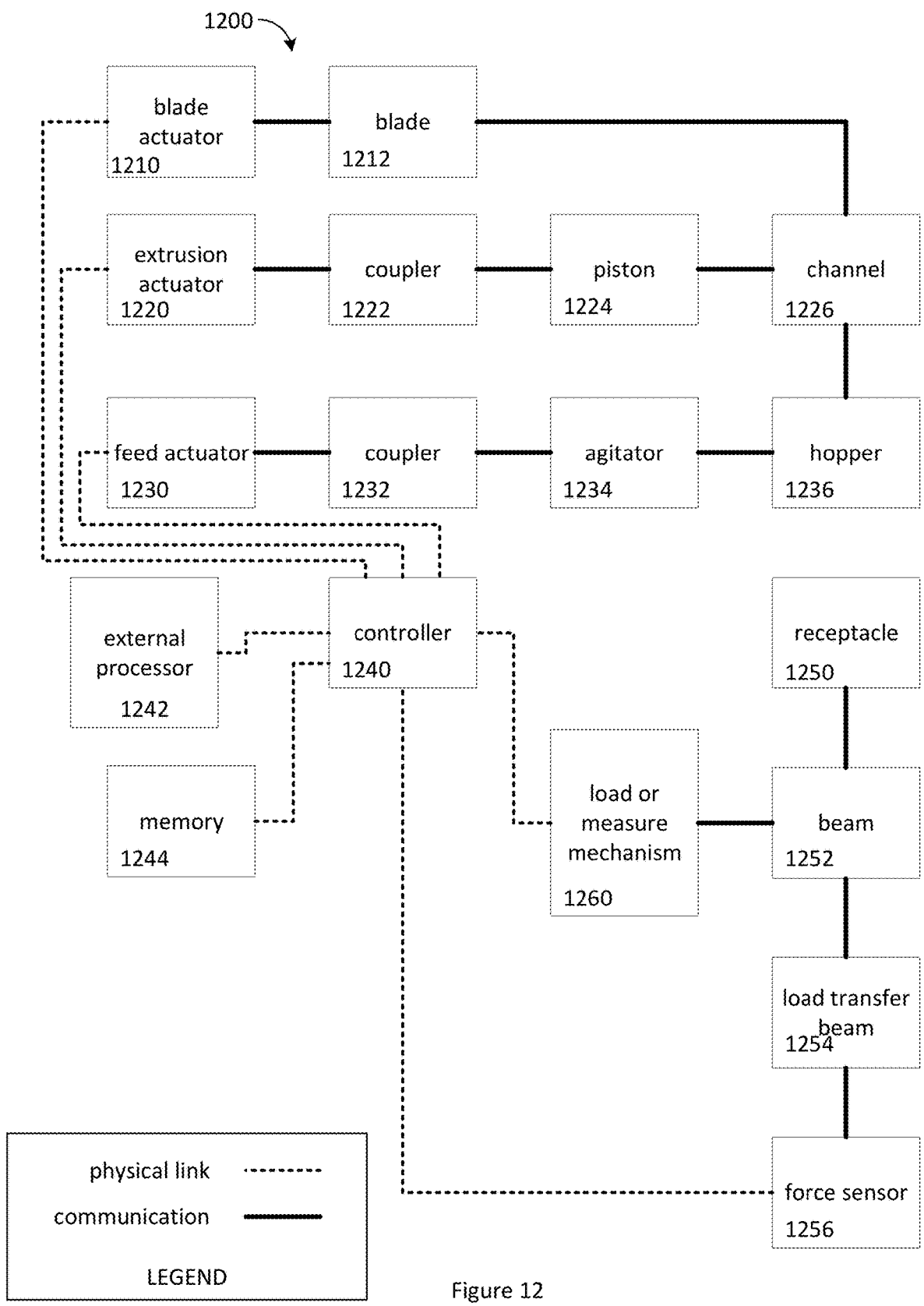
FIG. 12 is a block diagram of an exemplary powder dispensing fixture, according to certain aspects of the present disclosure.

FIG. 12 is a block diagram 1200 of an exemplary powder dispensing fixture, according to certain aspects of the present disclosure. Controller 1240 is communicatively coupled to blade actuator 1210, extrusion actuator 1220, feed actuator 1230, load-or-measure mechanism 1260, force sensor 1256, and a memory 1244. In certain embodiments, a portion of memory 1244 is integral to controller 1240 while in certain embodiments a portion of memory 1244 is separate and may be remote with a wired or wireless network interposed. In certain embodiments, controller 1240 is communicatively coupled to an external processor 1242.

Each actuator 1210, 1220, 1230 is physically coupled to its respective device, in this case blade 1212, piston 1224, and agitator 1234. In certain embodiments, a coupler, for example couplers 1222 and 1232, is disposed between the actuator and device. This piston 1224 is disposed within channel 1226 and hopper 1236 is coupled to an entry port (not shown in FIG. 12) of the channel 1226. The agitator 1234 is partially and movably disposed within hopper 1236.

The receptacle 1250, intended to receive the portion of compressed powder separated from the remaining portion of the compressed powder, is physically coupled to beam 1252 that is further coupled to load-or-measure mechanism 1260 and load transfer beam 1254. A force sensor 1256 is coupled to the load transfer beam 1254.

All of the physically linked items are coupled to a mechanical base, not shown in FIG. 12 for clarity, either directly, indirectly through another identified item, or through a secondary mechanical block omitted from FIG. 12 for clarity.

Figure 13:
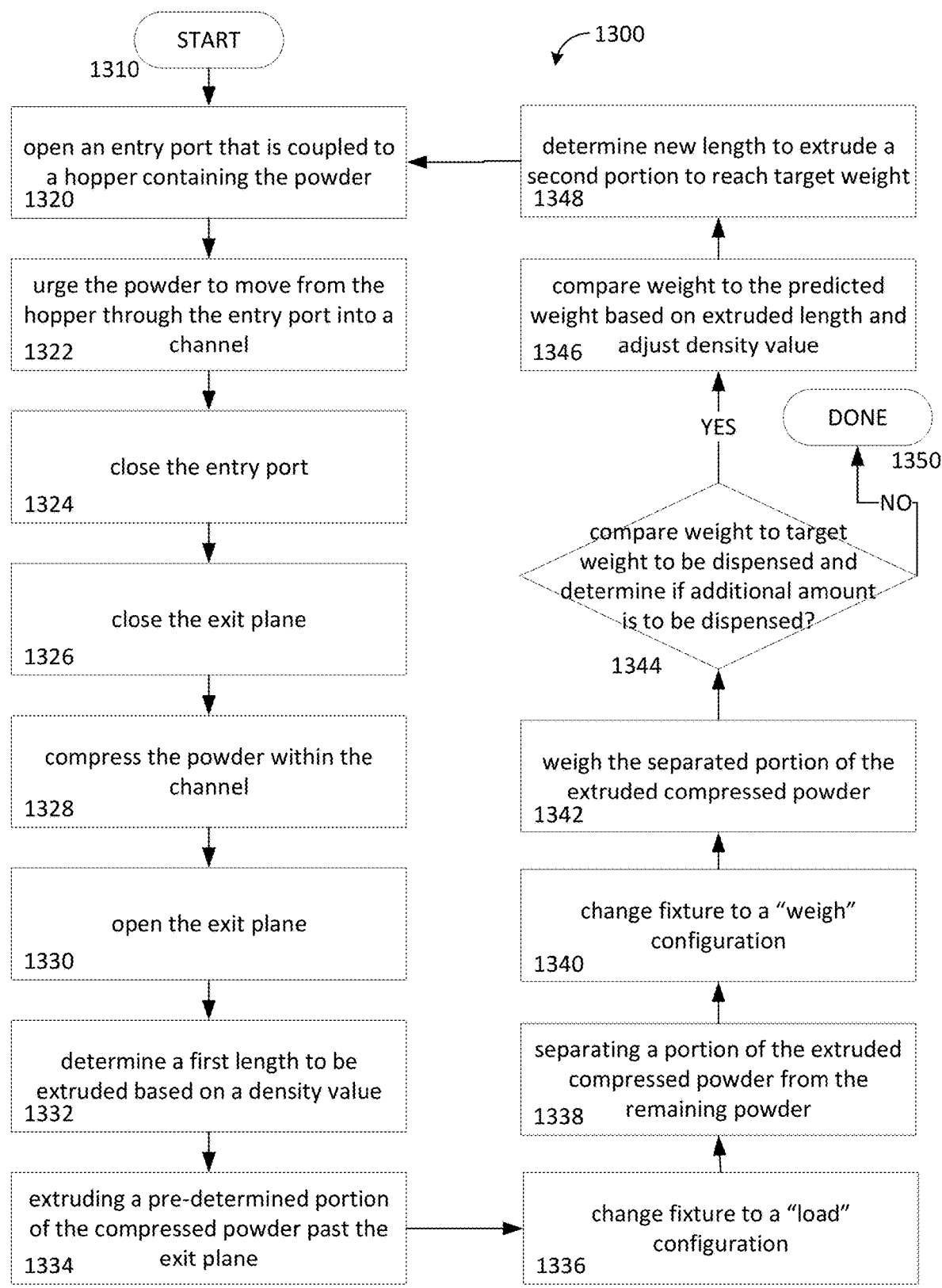
FIG. 13 is a flowchart of an exemplary process of dispensing a powder, according to certain aspects of the present disclosure.

FIG. 13 is a flowchart 1300 of an exemplary process of dispensing a powder, according to certain aspects of the present disclosure. The sequence of steps in FIG. 13 is exemplary and, in certain embodiments, steps are arranged in a different sequence. In certain embodiments, steps may be omitted.

From START 1310, the process step 1320 opens an entry port of the channel, which is coupled to a hopper containing a powder. Step 1322 urges the powder to flow, for example by reciprocating motion of an agitator within the hopper, through the entry port and into the channel. Step 1324 closes the entry port, for example by moving the piston forward within the channel to the position of FIG. 10B. Step 1326 closes the exit plane of the channel, for example by moving the blade to cover the opening of the channel. Step 1328 compresses the powder, for example by moving the piston forward with a pre-determined force and compressing the powder against the blade. After opening the exit plane in step 1330, for example by moving the blade away from the exit plane of the channel, and a first length to be extruded is determined in step 1332, a portion of the compressed powder is extruded from the channel in step 1334, for example by moving the piston forward a pre-determined distance.

In certain embodiments, the fixture 100 comprises a load-or-measure fixture, for example the fixture 770 of FIG. 7, that is moved to a "load" configuration in step 1336 to protect the force sensor from transient loads induced by receipt of a portion of the compressed powder separated from the remaining compressed powder in step 1338. The fixture is moved to a "weight" configuration in step 1340 then the separated portion of the compressed powder is weighed in decision step 1344. If the weight of the dispensed powder is within an acceptable range of a target value, the process branches along the "no" path to STOP 1350. If the weight of the dispensed powder is below an acceptable range of a target value, the process branches along the "yes" path to step 1346 that compares the actual incremental weight of the most-recent separated portion of compressed powder to the predicted incremental weight, e.g. a density, based on the length of the most-recent extruded portion. A new length for the next portion of compressed powder to be extruded is calculated in step 1348, based partially on the most-recent density and the most-recent difference between the weight of the dispensed powder and the target value. The process then returns to step 1320 to repeat a dispensing cycle with a new target value for a weight to be dispensed. In certain embodiments, step 1332 is omitted after the first pass through the process loop 1300.

This application includes description that is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented. Thus, the claims are not intended to be limited to the aspects shown herein, but is to be accorded the full scope consistent with the language claims.

EMBODIMENTS

In an embodiment, a module for dispensing a powder comprises a channel having an entry port; a hopper coupled to the entry port and configured to receive the powder; and a piston partially disposed within the channel and configured to reciprocate within the channel, the piston having a retracted position configured to allow the powder to move from the hopper through the entry port into the channel.

In an embodiment, the channel further comprises an exit plane; the apparatus further comprises a blade movably coupled to the channel, the blade having a closed position proximate to the exit plane of the channel; and the piston is further configured to selectably move forward toward the exit plane and compress the powder in the channel against the blade.

In an embodiment, the piston is further configured to move forward either with a pre-determined amount of force or by a pre-determined distance.

In an embodiment, the blade has an open position that exposes a portion of the channel at the exit plane; the piston is further configured to move further toward the exit plane and extrude a portion of the compressed powder from the channel through the open exit plane, and movement of the blade from the open position to the closed position will separate a portion of the extruded portion from the remaining portion of the compressed powder.

In an embodiment, the module further comprises an agitator movably disposed within the hopper, the agitator configured such that movement of the agitator will urge the powder to move from the hopper into the entry port.

In an embodiment, a fixture for dispensing a powder comprises a beam comprising a first end and second end; a receptacle coupled to the beam at the first end; a force sensor coupled to the beam at the second end; and a load transfer beam coupled between the force sensor and the second end, wherein the load transfer beam comprises two panels disposed between a first end and a second end and four hinge points that are respectively connected between one of the panels and one of the first end and the second end.

In an embodiment, the four hinge points are configured to bend when a load is applied vertically to the first end while the second end is fixed in position and rotation.

In an embodiment, the four hinge points are configured to uniformly bend when the load is applied.

In an embodiment, the first end translates without rotation with respect to the second end when the load is applied.

In an embodiment, the beam contacts the first end load transfer beam at a point.

In an embodiment, the fixture further comprises a module configured to dispensing a powder.

In an embodiment, the fixture further comprises a mechanism that selectably contacts the beam such a force caused by material placed in the receptacle does not apply a load to the load transfer beam.

In an embodiment, a method of dispensing a powder comprises the steps of opening an entry port that is coupled to a hopper containing the powder; allowing the powder to move from the hopper through the entry port into a channel; closing the entry port; compressing the powder within the channel; opening an exit plane of the channel; extruding a portion of the compressed powder past the exit plane; and separating a portion of the extruded compressed powder from the remaining compressed powder.

In an embodiment, the step of opening an entry port comprises moving a piston that is movably disposed within a channel to a retracted position wherein the entry port is open such that powder may move from the hopper through the entry port into the channel.

In an embodiment, the step of allowing the powder to move comprises activating an agitator that is partially disposed within the hopper, thereby urging the powder to move.

In an embodiment, the step of closing the entry port comprises moving the piston forward to close the entry port.

In an embodiment, the step of compressing the powder comprises applying a pre-determined force with the piston to the powder.

In an embodiment, the step of opening an exit plane comprises moving a blade that is movably disposed proximate to the exit plane of the channel to an open position wherein the channel is open at the exit plane.

In an embodiment, the step of extruding a portion of the compressed powder comprises moving the piston forward a pre-determined distance.

In an embodiment, the step of separating a portion of the extruded compressed powder comprises moving the blade to a closed position wherein the channel is closed at the exit plane.

Headings and subheadings, if any, are used for convenience only and do not limit the invention.

Reference to an element in the singular is not intended to mean "one and only one" unless specifically so stated, but rather "one or more." Use of the articles "a" and "an" is to be interpreted as equivalent to the phrase "at least one." Unless specifically stated otherwise, the terms "a set" and "some" refer to one or more.

Terms such as "top," "bottom," "upper," "lower," "left," "right," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference without limiting their orientation in other frames of reference.

Although the relationships among various components are described herein and/or are illustrated as being orthogonal or perpendicular, those components can be arranged in other configurations in some embodiments. For example, the angles formed between the referenced components can be greater or less than 90 degrees in some embodiments.

Although various components are illustrated as being flat and/or straight, those components can have other configurations, such as curved or tapered for example, in some embodiments.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "operation for."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such as an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Although embodiments of the present disclosure have been described and illustrated in detail, it is to be clearly understood that the same is by way of illustration and example only and is not to be taken by way of limitation, the scope of the present invention being limited only by the terms of the appended claims.

What is claimed is:

1. A module for dispensing a powder, comprising:
a channel having an entry port and an exit plane;
a hopper coupled to the entry port and configured to receive the powder;
a blade movably coupled to the channel, the blade having an open position that exposes the channel at the exit plane and a closed position that blocks the channel at the exit plane; and
a piston partially disposed within the channel and configured to:
reciprocate within the channel;
move forward toward the exit plane and compress the powder in the channel against the blade when the blade is in the closed position,
move further forward after the blade is moved to the open position and extrude a portion of the compressed powder from the channel through the open exit plane, whereupon movement of the blade from the open position to the closed position will separate the extruded portion from a remaining portion of the compressed powder; and
move backward to a retracted position configured to allow the powder to move from the hopper through the entry port into the channel.

2. The module of claim 1, wherein the piston is further configured to move forward either with a pre-determined amount of force or by a pre-determined distance.

3. The module of claim 1, further comprising an agitator movably disposed within the hopper, the agitator configured such that movement of the agitator will urge the powder to move from the hopper into the entry port.

* * * * *